(12) United States Patent
Zhang et al.

(10) Patent No.: US 11,481,666 B2
(45) Date of Patent: Oct. 25, 2022

(54) METHOD AND APPARATUS FOR ACQUIRING INFORMATION

(71) Applicant: Baidu Online Network Technology (Beijing) Co., Ltd., Beijing (CN)

(72) Inventors: Xiaodi Zhang, Beijing (CN); Chengze Chen, Beijing (CN); Yunfeng Xu, Beijing (CN); Weiyu Chen, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 953 days.

(21) Appl. No.: 16/250,894

(22) Filed: Jan. 17, 2019

(65) Prior Publication Data
US 2019/0228337 A1 Jul. 25, 2019

(30) Foreign Application Priority Data
Jan. 19, 2018 (CN) .......................... 201810055484.8

(51) Int. Cl.
*G06N 20/00* (2019.01)
*H04W 4/029* (2018.01)
(Continued)

(52) U.S. Cl.
CPC ......... *G06N 20/00* (2019.01); *G06F 16/2465* (2019.01); *G06F 16/29* (2019.01);
(Continued)

(58) Field of Classification Search
CPC ....... G06N 20/00; G06N 5/048; H04W 4/029; H04W 4/021; G06F 16/2465; G06F 16/29; G06F 2216/03
See application file for complete search history.

(56) References Cited

U.S. PATENT DOCUMENTS 9,846,887 B1* 12/2017 Cranshaw .......... G06Q 30/0205
9,904,932 B2* 2/2018 Fabrikant .............. H04W 4/029
(Continued)

FOREIGN PATENT DOCUMENTS

CN 105844681 A 8/2016

OTHER PUBLICATIONS

Algorithms, 4th Edition, 2011, Pearson Education, Sedgewick pp. 515-525.*
(Continued)

*Primary Examiner* — Michael I Ezewoko
(74) *Attorney, Agent, or Firm* — Knobbe, Martens, Olson & Bear, LLP

(57) ABSTRACT

Embodiments of methods and apparatuses for acquiring information are provided. One implementation of the method can include: determining an initial area corresponding to a target point of interest, and dividing the initial area corresponding to the target point of interest into a plurality of grids; and generating annotations of the plurality of grids respectively based on characteristics of the plurality of grids. Therefore, whether the user data associated with the each of the plurality of grids is used to generate the attribute of the target point of interest may be directly determined based on the annotation of the each of the plurality of grids, thereby saving the spending of the process of acquiring the user data required for generating the attribute of the target point of interest in data mining. The operation state of the target point of interest may be determined based on the annotation of the grid.

12 Claims, 5 Drawing Sheets

(51) Int. Cl.
*G06F 16/29* (2019.01)
*G06N 5/04* (2006.01)
*H04W 4/021* (2018.01)
*G06F 16/2458* (2019.01)

(52) U.S. Cl.
CPC ............ *G06N 5/048* (2013.01); *H04W 4/021* (2013.01); *H04W 4/029* (2018.02); *G06F 2216/03* (2013.01)

(56) References Cited

U.S. PATENT DOCUMENTS

| | | | |
|---|---|---|---|
| 10,592,914 B2 * | 3/2020 | Milton | G06Q 30/02 |
| 10,713,672 B1 * | 7/2020 | Cranshaw | G06Q 30/0205 |
| 11,093,561 B2 * | 8/2021 | Douze | G06F 16/24542 |

OTHER PUBLICATIONS

Analysing the Social Web, Golbeck, Morgan Kaufman, 2013, Chapters 3, 9.*
Bisociative Knowledge Discovery, Berthodl, Springer, 2012, pp. 66-90.*
Context-aware recommender systems in mobile environment, Sassi, Elsevier, 2017, pp. 27-61.*

* cited by examiner

METHOD AND APPARATUS FOR ACQUIRING INFORMATION

CROSS-REFERENCE TO RELATED APPLICATIONS

This application claims priority to Chinese Patent Application no. 201810055484.8, filed in China on Jan. 19, 2018, the contents of which are incorporated herein by reference in their entirety.

TECHNICAL FIELD

The present disclosure relates to the field of computer, specifically to the field of data mining, and more specifically to a method and apparatus for acquiring information.

BACKGROUND

In data mining of a target point of interest, it is necessary to determine user data for data mining of the target point of interest, and use the user data for data mining of the target point of interest to generate an attribute of the target point of interest. At present, a commonly used method is: manually marking the contour of the target point of interest based on position data related to the target point of interest in an electronic map, and using user data of users appearing in the contour of the manually marked target point of interest as the user data for data mining of the target point of interest. Since the number of the target points of interest is massive, the cost of manual marking is huge.

SUMMARY

Embodiments of the present disclosure provide a method and apparatus for acquiring information.

In a first aspect, the embodiments of the present disclosure provide a method for acquiring information. The method includes: determining an initial area corresponding to a target point of interest, and dividing the initial area corresponding to the target point of interest into a plurality of grids; and generating annotations of the plurality of grids respectively based on characteristics of the plurality of grids, the characteristic of each of the plurality of grids including at least one of the following: dwell time, or a degree of relevance between the each of the plurality of grids and other grids, the annotation of each of the plurality of grids being used for indicating whether user data associated with the each of the plurality of grids is used to generate an attribute of the target point of interest.

In a second aspect, the embodiments of the present disclosure provide an apparatus for acquiring information. The apparatus includes: a processing unit, configured to determine an initial area corresponding to a target point of interest, and divide the initial area corresponding to the target point of interest into a plurality of grids; and a generation unit, configured to generate annotations of the plurality of grids respectively based on characteristics of the plurality of grids, the characteristic of each of the plurality of grids including at least one of the following: dwell time, or a degree of relevance between the each of the plurality of grids and other grids, the annotation of each of the plurality of grids being used for indicating whether user data associated with the each of the plurality of grids is used to generate an attribute of the target point of interest.

The method and apparatus for acquiring information provided by the embodiments of the present disclosure an initial area corresponding to a target point of interest, and divide the initial area corresponding to the target point of interest into a plurality of grids; and generate annotations of the plurality of grids respectively based on characteristics of the plurality of grids, the characteristic of each of the plurality of grids comprising at least one of: dwell time, or a degree of relevance between the each of the plurality of grids and other grids, the annotation of each of the plurality of grids being used for indicating whether user data associated with the each of the plurality of grids is used to generate an attribute of the target point of interest. Therefore, whether the user data associated with the each of the plurality of grids is used to generate the attribute of the target point of interest may be directly determined based on the annotation of the grid, thereby saving the spending of the process of acquiring the user data required for generating the attribute of the target point of interest in data mining. The operation state of the target point of interest may be determined based on the annotation of the grid.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
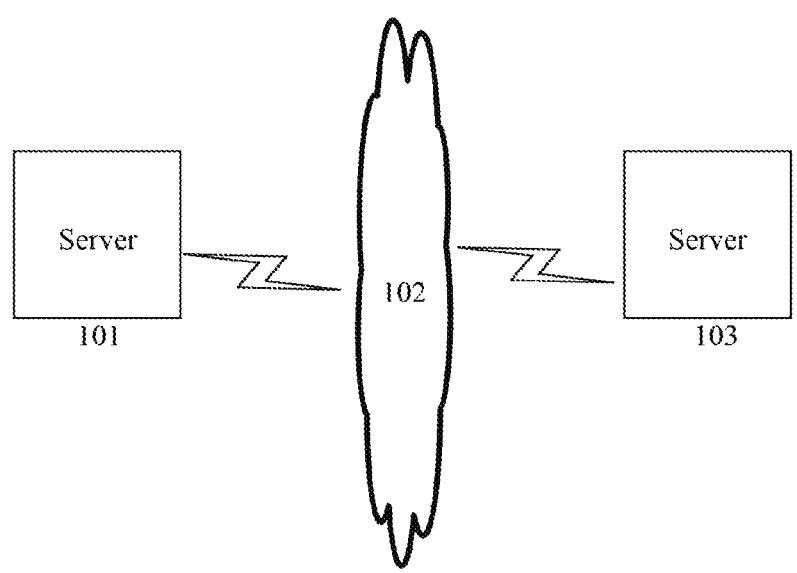
FIG. 1 shows a system architecture to which the embodiments of a method or apparatus for acquiring information of the present disclosure may be applied.

FIG. 1 shows a system architecture to which the embodiments of a method or apparatus for acquiring information of the present disclosure may be applied.

As shown in FIG. 1, the system architecture includes a server 101, a network 102, and a server 103. The network 102 may be a wired communication network.

The server 101 may be a server that provides location-based services (LBS) that stores a large number of user locations.

The server 103 may acquire, from the server 101, a plurality of user locations appeared in an initial area corresponding to a target point of interest within a preset period, and multiple acquired user locations may belong to one user. The server 103 may divide the initial area corresponding to the target point of interest into a plurality of grids, and generate an annotation of each of the plurality of grids respectively based on the acquired plurality of user locations.

Figure 2:
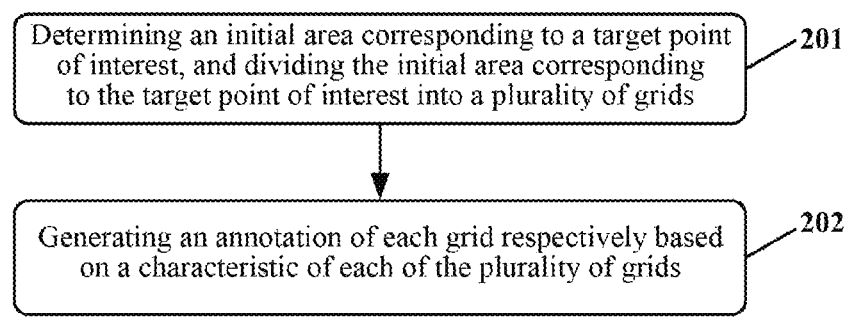
FIG. 2 shows a flowchart of an embodiment of the method for acquiring information according to the present disclosure.

With reference to FIG. 2, a flow of an embodiment of the method for acquiring information according to the present disclosure is illustrated. The method for acquiring information provided by the embodiments of the present disclosure may be performed by a server (for example, the server 103 in FIG. 1). The method includes the following steps:

Step 201, determining an initial area corresponding to a target point of interest, and dividing the initial area corresponding to the target point of interest into a plurality of grids.

In the present embodiment, a target point of interest may be a shopping mall, a residential area, or the like. An initial area corresponding to the target point of interest may be first determined.

In the present embodiment, the server may determine the initial area corresponding to the target point of interest, and divide the initial area corresponding to the target point of interest into a plurality of grids. Each of the plurality of grids is a sub-area obtained by dividing the initial area corresponding to the target point of interest.

In the present embodiment, when determining the initial area corresponding to the target point of interest, the initial area corresponding to the target point of interest may be determined based on road network information. For example, the target point of interest is a shopping mall, roads and transportation facilities around the shopping mall, such as a subway station, may be determined based on road network data, and an area surrounded by the roads and transportation facilities around the shopping mall is determined as the initial area corresponding to the shopping mall. The initial area corresponding to the shopping mall contains the actual area occupied by the shopping mall.

In the present embodiment, any one of the positioned people whose positioning data may be acquired for a period may be referred to as a user. Taking the target point of interest being a shopping mall as an example, a user may be a person who appeared in the actual area occupied by the shopping mall in a period, in other words, the user is a person who visits the shopping mall in a period. A user may also be a person who appeared in the vicinity of the shopping mall in the initial area corresponding to the shopping mall in a period, for example, at a subway station near the shopping mall, in other words, the user have not visited the shopping mall, but passes by the shopping mall.

In the present embodiment, for a target point of interest, user locations in the initial area corresponding to the target point of interest within the preset period may be acquired in advance. The time difference between the starting time of the preset period and the execution time of the step 201 is less than a time difference threshold. In other words, the starting time of the preset period is a time point close to the execution time of the step 201, and the user locations that recently appear at the target point of interest are acquired. In the acquired user locations in the initial area corresponding to the target point of interest within the preset period, multiple user locations may belong to the same user. A plurality of user locations belonging to one user constitute a historical trajectory of the user.

For example, the target point of interest is a shopping mall, and the preset period is the business hours of the shopping mall on a given day, and a plurality of user locations appeared in the initial area corresponding to the shopping mall within the business hours of the shopping mall on a given day may be acquired.

In some alternative implementations of the present embodiment, when dividing the initial area corresponding to the target point of interest into a plurality of grids, the plurality of user locations appeared within the preset period may first be clustered to obtain a plurality of location clustering results. Each of the plurality of location clustering results includes the plurality of user locations, and multiple user locations may belong to the same user. The center point of each clustering result may be determined. A clustering result includes at least one user location, and the center point of a clustering result may be determined as the center point of a to-be-generated grid. For the center point of a to-be-generated grid, the center point of the grid may be connected to the center points of a preset number of other to-be-generated grids closest in distance to the center point of the to-be-generated grid respectively, to obtain a plurality of connecting lines corresponding to the center points of the grids. Then, the respective mid-perpendicular lines of the plurality of connecting lines are determined, the intersections between the respective mid-perpendicular lines of the plurality of connecting lines may constitute corner points of the gird, thereby constructing a contour of the grid to obtain the grid.

Figure 3:
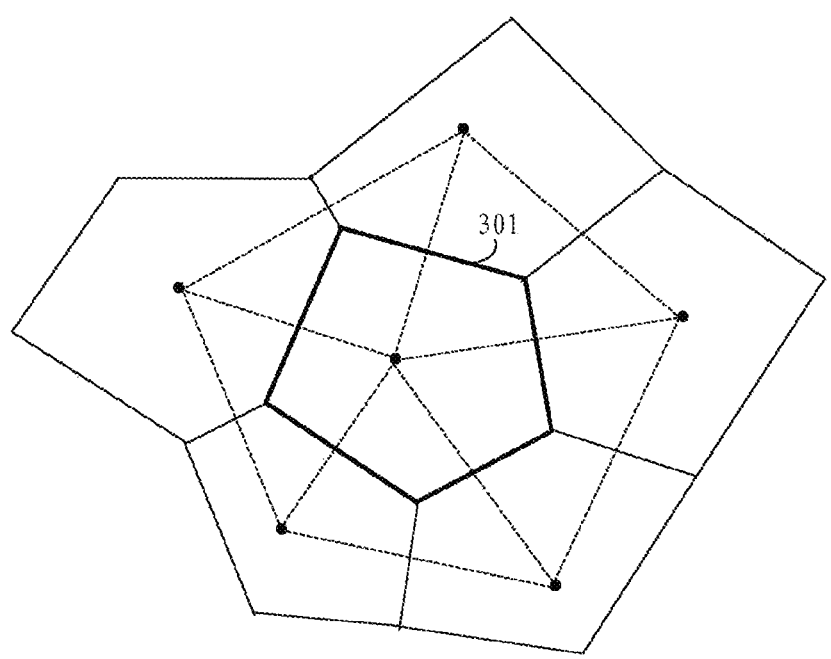
FIG. 3 shows a schematic diagram of the effect of dividing a grid according to some embodiments of the present disclosure.

With reference to FIG. 3, a schematic diagram of the effect of dividing a grid is illustrated.

In FIG. 3, part of the grids in the target point of interest are shown, and a grid 301 in the part of the grids is a pentagon. In FIG. 3, the center points of a plurality of location clustering results, that is, the center points of a plurality of grids are shown. The connecting lines between the center points of two grids is indicated by a dashed line. The center point of the grid 301 is connected to the center points of the other five nearest grids to form five connecting lines. Accordingly, the mid-perpendicular line of each of the five connecting lines may be determined to obtain five mid-perpendicular lines. The intersections of adjacent ones of the five mid-perpendicular lines constitutes the corner points of the grid 301, thereby obtaining the contour of the grid 301, resulting in the grid 301. A portion of each of the five mid-perpendicular lines forms an edge of the grid 301, respectively.

Step 202, generating annotations of the plurality of grids respectively based on characteristics of the plurality of grids.

In the present embodiment, a characteristic of a grid includes at least one of the following: dwell time, or a degree of relevance between the each of the plurality of grids and other grids, and an annotation of a grid includes: indicating whether user data associated with the grid is used to generate an attribute of the target point of interest.

In the present embodiment, an annotation of each of the plurality of grids may be generated respectively based on the characteristic of each of the plurality of grids. Therefore, in the subsequent data mining for generating the attribute of the target point of interest, whether the user data associated with the each of the plurality of grid is used to generate the attribute of the target point of interest may be directly determined based on the annotation of the each of the plurality of grids.

For example, the target point of interest is a shopping mall, and the data mining of the target point of interest may be generating attributes such as visitor flow, or turnover of the shopping mall. The user data associated with a grid includes the expenditure of the user who appeared in the grid, the type of store consumed in, and the like. When the grid is the area occupied by the subway station near the shopping mall in the initial area corresponding to the shopping mall, since the user who appears at the subway station does not stay at the subway station, almost all users who have appeared in the grid have a short dwell time, and the dwell time of the grid is short. An annotation indicating that the user data associated with the grid is not used to generate the attribute of the shopping mall may be generated based on the dwell time in the grid.

As another example, the target point of interest is a shopping mall, and the shopping mall is in a closed state. For any grid obtained by dividing the initial area corresponding to the shopping mall, no or very few users appear in the grid, and correspondingly, the dwell time of any grid is close to zero. Based on the dwell time of the grid, it may be determined that no or very few users stay in any grid in the initial area corresponding to the shopping mall, and an annotation indicating that each of the plurality of grids is not used to generate the attribute of the target point of interest may be generated. At the same time, since the annotations of all the grids are annotations indicating that the grid is not used to generate the attribute of the target point of interest, it may be determined that the business status of the shopping mall is the closed state, and the business status of the shopping mall is marked. No data mining is performed on the shopping mall.

In the present embodiment, an annotation of each of the plurality of grids may be generated respectively based on the dwell time of each of the plurality of grids.

In the present embodiment, when determining the dwell time of a user that appeared in a grid, the dwell time of the user that appeared in the grid may be determined based on the time difference between the earliest acquisition time and the latest acquisition time of the acquired acquisition times of the plurality of locations in the grid.

In the present embodiment, the dwell time of the grid may include: dwell time of each user that appeared in the grid within a preset period. When generating the annotation of the grid based on the dwell time of the grid, the ratio of the number of users whose dwell time in the grid is greater than a period threshold within the preset period to the total number of all the users who appeared in the grid within the preset period may be determined. When the ratio is greater than a ratio threshold, then an annotation indicating that the user data associated with the grid is used to generate the attribute of the target point of interest may be generated. When the ratio is not greater than the ratio threshold, an annotation indicating that the user data associated with the grid is not used to generate the attribute of the target point of interest may be generated.

In the present embodiment, the degree of relevance of a grid may include: a Jaccard similarity coefficient between the grid and each of the other grids. In calculating the Jaccard similarity coefficient between the grid and each of the other grids, a user identifier set corresponding to the grid and a user identifier set corresponding to the each of the other grids may be first generated. The user identifier set corresponding to the grid includes identifiers of users appeared in the grid within the preset period, and the user identifier set corresponding to the each of the other grids includes identifiers of users appeared in the each of the other grids within the preset period. Then, a Jaccard similarity coefficient between the user identifier set corresponding to the grid and the user identifier set corresponding to the each of the other grids is calculated, and the calculated Jaccard similarity coefficient is determined as the Jaccard similarity coefficient between the grid and the each of the other grids.

In the present embodiment, when the annotation of a grid is generated based on the degree of relevance of the grid, the number of other grids whose Jaccard similarity coefficient to the grid is greater than a similarity threshold may be determined. When the number of the other grids whose Jaccard similarity coefficient to the grid is greater than the similarity threshold is greater than a number threshold, an annotation of the grid indicating that the user data associated with the grid is used to generate the attribute of the target point of interest may be generated. When the number of the other grids whose Jaccard similarity coefficient to the grid is greater than the similarity threshold is less than the number threshold, then an annotation of the grid indicating that the user data associated with the grid is not used to generate the attribute of the target point of interest may be generated.

Taking the target point of interest being a shopping mall as an example, when the Jaccard similarity coefficients between the grid and a plurality of other grids are greater than the similarity threshold, it indicates that a given number of users that appeared in the grid have also appeared in several other grids within the preset period. Since the users who visit the shopping mall have the shopping behaviour, when the given number of users that appeared in the grid have also appeared in several other grids within the preset period, it may be equivalent to the users who appeared in the grid are the users who visited the shopping mall. Accordingly, an annotation of the grid indicating that the user data associated with the grid is used to generate the attribute of the target point of interest may be generated.

In some alternative implementations of the present embodiment, dwell time of a grid may be a median of dwell time of all the users appeared in the grid within the preset period. When determining the annotation of the grid based on the dwell time of the grid, whether the dwell time of the grid (i.e., the median of the dwell time of all the users appeared in the grid within the preset period) is greater than a period threshold may be determined. When the median of the dwell time of all the users appeared in the grid within the preset period is greater than the period threshold, an annotation of the grid indicating that the user data associated with the grid is used to generate the attribute of the target point of interest may be generated.

In some alternative implementations of the present embodiment, for a grid, a Jaccard similarity coefficient between the grid and each of the other grids may be calculated. In calculating the Jaccard similarity coefficient between the grid and the each of the other grids, a user identifier set corresponding to the grid and user identifier sets corresponding to the each of the other grids may be first generated. The user identifier set corresponding to the grid includes identifiers of users appeared in the grid within the preset period, and the user identifier sets corresponding to the each of the other grids include identifiers of users appeared in the each of the other grids within the preset period. Then, Jaccard similarity coefficients between the user identifier set corresponding to the grid and the user identifier sets corresponding to the each of the other grids are calculated, and the calculated Jaccard similarity coefficients are determined as the Jaccard similarity coefficients between the grid and the each of the other grids.

After calculating respectively the Jaccard similarity coefficients between each of the plurality of grids and each of the other grids, the Jaccard similarity coefficient between each pair of grids in a plurality of grids may be obtained. The total similarity corresponding to each of the plurality of grids may be determined based on the Jaccard similarity coefficient between each pair of grids in the plurality of grids. Then, the determined total similarity corresponding to each of the plurality of grids is respectively used as the degree of relevance of the each of the plurality of grids.

For example, a pagerank algorithm may be adopted, and each of the plurality of grids may be used as a node in the pagerank algorithm, and the weight between two nodes is the Jaccard similarity coefficient between the grids respectively corresponding to the two nodes. The weight of each of the plurality of grids is calculated, and the calculated weight of each of the plurality of grids is respectively used as the total similarity corresponding to each of the plurality of grids.

In some alternative implementations of the present embodiment, In some alternative implementations of the present embodiment, dwell time of a grid may be the median of dwell time of all the users appeared in the grid within the preset period, and the degree of relevance of a grid may be the total similarity corresponding to the grid. When generating the annotation of the grid based on the dwell time and the degree of relevance of the grid, it may determine whether a preset condition is met. The preset condition includes: the dwell time of the grid, that is, the median of dwell time of all the users appeared in the grid within the preset period is greater than a period threshold and a product of a dwell time difference and the degree of relevance is greater than a product threshold. The dwell time difference is the difference between the dwell time of the grid and the period threshold. When the present condition is satisfied, an annotation of the grid indicating the user data associated with the grid is used to generate the attribute of the target point of interest may be generated. When the preset condition is not satisfied, an annotation of the grid indicating the user data associated with the grid is not used to generate the attribute of the target point of interest may be generated.

In the present embodiment, the server may perform step 201-step 202 every preset period, for example, one month. Accordingly, each time step 201-step 202 is performed, the preset period in step 201-step 202 may be a period in the day between the starting time of this execution and the starting time of the previous execution. Therefore, the annotation of each of the plurality of grids is updated in time. The operation status of the target point of interest may be determined based on the updated annotation every preset period. when the target point of interest is in a state of discontinuation, it is ensured that the user data associated with the grid is not used to generate the attribute of the target point of interest and result in erroneous data mining results.

Figure 4:
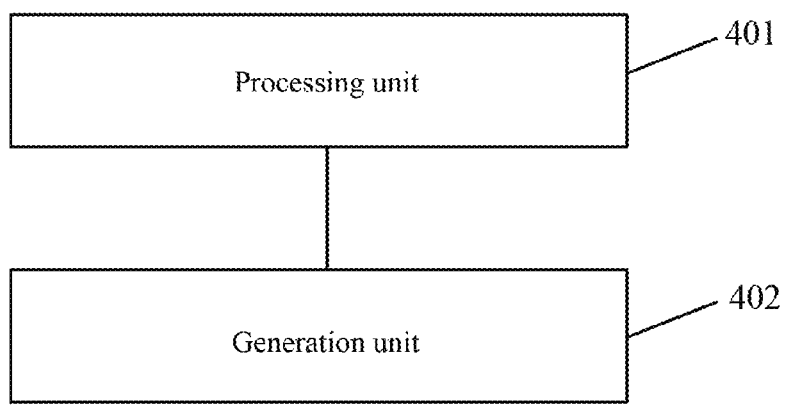
FIG. 4 shows a schematic structural diagram of an embodiment of an apparatus for acquiring information according to the present disclosure.

With further reference to FIG. 4, as an implementation to the method shown in the above figures, the present disclosure provides an embodiment of an apparatus for acquiring information. The apparatus embodiment corresponds to the method embodiment shown in FIG. 2.

As shown in FIG. 4, the apparatus for acquiring information of the present embodiment includes: a processing unit 401 and a generation unit 402. The processing unit 401 is configured to determine an initial area corresponding to a target point of interest, and divide the initial area corresponding to the target point of interest into a plurality of grids. The generation unit 402 is configured to generate annotations of the plurality of grids respectively based on characteristics of the plurality of grids, the characteristic of each of the plurality of grids including at least one of the following: dwell time, or a degree of relevance between the each of the plurality of grids and other grids, the annotation of each of the plurality of grids being used for indicating whether user data associated with the each of the plurality of grids is used to generate an attribute of the target point of interest.

In some alternative implementations of the present embodiment, the processing unit includes: a grid dividing subunit, configured to acquire a plurality of user locations appeared in the initial area corresponding to the target point of interest within a preset period; cluster the plurality of user locations to obtain a plurality of location clustering results; determine a center point of each of the plurality of location clustering results as the center point of each of a plurality of to-be-generated grids respectively, the center point of the each of the plurality of location clustering results corresponding to the center point of the each of the plurality of to-be-generated grids; and determine, for the center point of the each of the plurality of to-be-generated grids, the center points of a preset number of other to-be-generated grids closest in distance to the center point of the each of the plurality of to-be-generated grids, and determine a contour of the each of the plurality of to-be-generated grid, based on the center point of the each of the plurality of to-be-generated grid and the determined center points of the preset number of other to-be-generated grids closest in distance to the center point of the each of the plurality of to-be-generated grids.

In some alternative implementations of the present embodiment, the apparatus further includes: a relevance calculation unit, configured to calculate, for the each of the plurality of grids, a Jaccard similarity coefficient between the each of the plurality of grids and each of the other grids, wherein the Jaccard similarity coefficient between the each of the plurality of grids to the each of the other grids is determined based on a number of users concurrently appeared in the each of the plurality of grids and the each of the other grids within the preset period, and a sum of a number of users appeared in the each of the plurality of grids within the preset period and the number of users appeared in the each of the other grids; determine a total similarity corresponding to the each of the plurality of grids based on the Jaccard similarity coefficient between each pair of grids in the plurality of grids; and use the determined total similarity corresponding to the each of the plurality of grids as the degree of relevance of the each of the plurality of grids respectively.

In some alternative implementations of the present embodiment, the generation unit includes: a first marking subunit, configured to determine, for the each of the plurality of grids, whether the dwell time of the each of the plurality of grids is greater than a period threshold, when the dwell time of the each of the plurality of grids is a median of the dwell time of the users appeared in the each of the plurality of grids within the preset period; if yes, generate the annotation of the each of the plurality of grids for indicating the user data associated with the each of the plurality of grids is used to generate the attribute of the target point of interest; and if not, generate the annotation of the each of the plurality of grids for indicating the user data associated with the each of the plurality of grids is not used to generate the attribute of the target point of interest.

In some alternative implementations of the present embodiment, the generation unit includes: a second marking subunit, configured to determine, for the each of the plurality of grids, whether the degree of relevance of the each of the plurality of grids is greater than a degree of relevance threshold; if yes, generate the annotation of the each of the plurality of grids for indicating the user data associated with the each of the plurality of grids is used to generate the attribute of the target point of interest; and if not, generate the annotation of the each of the plurality of grids for indicating the user data associated with the each of the plurality of grids is not used to generate the attribute of the target point of interest.

In some alternative implementations of the present embodiment, the generation unit includes: a third marking subunit, configured to determine, for the each of the plurality of grids, whether a preset condition is met, wherein the preset condition comprises: the dwell time of the each of the plurality of grids is greater than a period threshold, and a product of a dwell time difference and the degree of relevance is greater than a product threshold, the dwell time difference being a difference between the dwell time of the each of the plurality of grids and the period threshold; if yes, generate the annotation of the each of the plurality of grids for indicating the user data associated with the each of the plurality of grids is used to generate the attribute of the target point of interest; and if not, generate the annotation of the each of the plurality of grids for indicating the user data associated with the each of the plurality of grids is not used to generate the attribute of the target point of interest.

Figure 5:
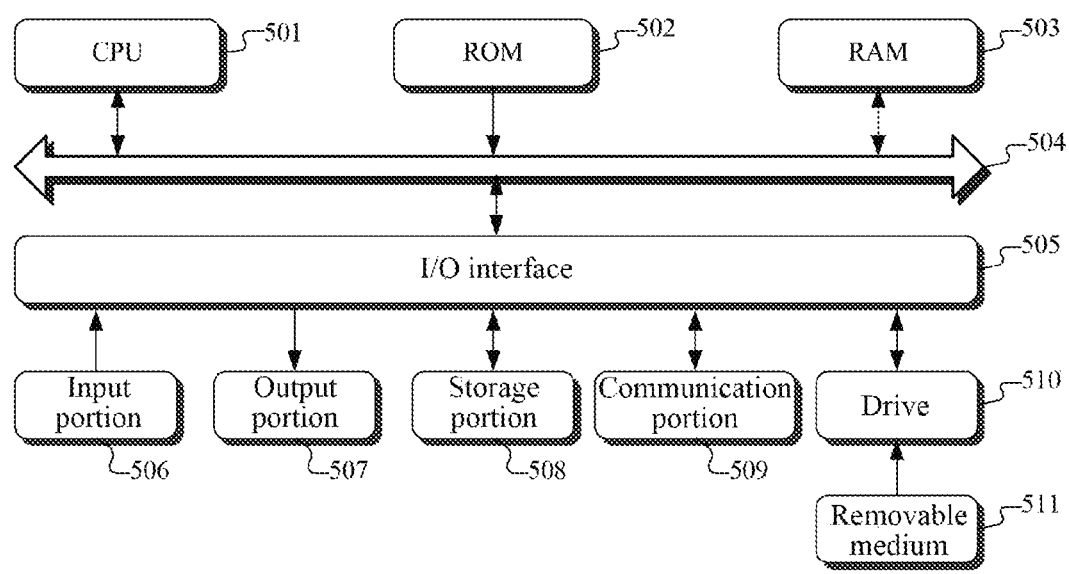
FIG. 5 is a schematic structural diagram of a computer system adapted to implement a server of the embodiments of the present disclosure.

Referring to FIG. 5, a schematic structural diagram of a computer system adapted to implement a server of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A drive 510 is also connected to the I/O interface 505 as required. A removable medium 511, such as a magnetic disk, an optical disk, a magneto-optical disk, and a semiconductor memory, may be installed on the drive 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of some embodiments of the present disclosure.

In another aspect, the present application further provides a server, comprising: one or more processors; a storage apparatus, for storing one or more programs, the one or more programs include the instructions for implementing the operations described in the above steps 201 and 202. When the one or more programs are executed by the one or more processors, the one or more processors are caused to implement the operations described in the above steps 201 and 202.

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: determine an initial area corresponding to a target point of interest, and divide the initial area corresponding to the target point of interest into a plurality of grids; and generate annotations of the plurality of grids respectively based on characteristics of the plurality of grids, the characteristic of each of the plurality of grids comprising at least one of: dwell time, or a degree of relevance between the each of the plurality of grids and other grids, the annotation of each of the plurality of grids being used for indicating whether user data associated with the each of the plurality of grids is used to generate an attribute of the target point of interest.

It should be noted that the computer readable medium in some embodiments of the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a processing unit and a generation unit.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for acquiring information, the method comprising:
    determining an initial area corresponding to a target point of interest, and dividing the initial area corresponding to the target point of interest into a plurality of grids, wherein the dividing the initial area corresponding to the target point of interest into a plurality of grids comprises:
        acquiring a plurality of user locations appeared in the initial area corresponding to the largest point of interest within a preset period;
        clustering the plurality of user locations to obtain a plurality of location clustering results;
        determining a center point of each of the plurality of location clustering results as the center point of each of a plurailty of to-be-generated grids respectively, the center point of the each of the plurality of location clustering results corresponding to the center point of the each of the plurality of to-be-generated grids; and
        determining, for the center point of the each of the plurality if to-be-generated grids, the center points of a preset number of other to-be-generated grids closest in distance to the center point of the each of the plurality of to-be-generated grids, and determining a contour of each of the plurality of to-be-generated grid, based on the center point of the each of the plurality of to-be-generated grid and the determined center points of the preset number of other to-be-generated grids closest in distance to the ceneter point of the each of the plurality of to-be-generated grids;
    calculating, for the each of the plurality of grids, a Jaccard similarity coefficient between the each of the plurality of grids and each of the other grids, wherein the Jaccard similarity coeffiecient between the each of the plurality of grids to the each of the other grids is determined based on a number of users concurrently appeared in the each of the plurality of grids and the each of the other grids within the preset period, and a sum of a number of users appeared in the each of the plurality of grids within the preset period and the number of users appeared in the each of the other grids; and
    generating an annotation of each of the plurality of grids respectively based on characteristics of the plurality of grids, the characteristic of each of the plurality of grids comprising: dwell time, and a degree of relevance between the each of the plurality of grids and other grids, the annotation of each of the plurality of grids being used for indicating whether user data associated with the each of the plurality of grids is used to generate an attribute of the target point of interest,
    wherein the method is performed by at least one processor.

2. The method according to claim 1, further comprising:
    determining a total similarity corresponding to the each of the plurality of grids based on the Jaccard similarity coefficient between each pair of grids in the plurality of grids; and
    using the determined total similarity corresponding to the each of the plurality of grids as the degree of relevance of the each of the plurality of grids respectively.

3. The method according to claim 2, wherein the dwell time of the each of the plurality of grids is a median of the dwell time of the users appeared in the each of the plurality of grids within the preset period; and
    the generating annotations of the plurality of grids respectively based on characteristics of the plurality of grids comprises:
    determining, for the each of the plurality of grids, whether the dwell time of the each of the plurality of grids is greater than a period threshold;
    in response to determining that the dwell time is greater than the period threshold, generating the annotation of the each of the plurality of grids for indicating the user data associated with the each of the plurality of grids is used to generate the attribute of the target point of interest; and
    in response to determining that the dwell time is not greater than the period threshold, generating the annotation of the each of the plurality of grids for indicating the user data associated with the each of the plurality of grids is not used to generate the attribute of the target point of interest.

4. The method according to claim 2, wherein the generating annotations of the plurality of grids respectively based on characteristics of the plurality of grids comprises:
    determining, for the each of the plurality of grids, whether the degree of relevance of the each of the plurality of grids is greater than a degree of relevance threshold;
    in response to determining that the degree of relevance is greater than the degree of relevance threshold, generating the annotation of the each of the plurality of grids for indicating the user data associated with the each of the plurality of grids is used to generate the attribute of the target point of interest; and
    in response to determining that the degree of relevance is not greater than the degree of relevance threshold, generating the annotation of the each of the plurality of grids for indicating the user data associated with the each of the plurality of grids is not used to generate the attribute of the target point of interest.

5. The method according to claim 2, wherein the generating annotations of the plurality of grids respectively based on characteristics of the plurality of grids comprises:

determining, for the each of the plurality of grids, whether a preset condition is met, wherein the preset condition comprises: the dwell time of the each of the plurality of grids is greater than a period threshold, and a product of a dwell time difference and the degree of relevance is greater than a product threshold, the dwell time difference being a difference between the dwell time of the each of the plurality of grids and the period threshold;

in response to determining that the preset condition is met, generating the annotation of the each of the plurality of grids for indicating the user data associated with the each of the plurality of grids is used to generate the attribute of the target point of interest; and in response to determining that the preset condition is not met, generating the annotation of the each of the plurality of grids for indicating the user data associated with the each of the plurality of grids is not used to generate the attribute of the target point of interest.

6. The method according to claim 1, wherein the method further comprises:

determining that the degree of relevance for a particular grid is below a threshold; and in response to determining that the degree of relevance for the particular grid is below the threshold, generating the attribute of the target point of interest without user data associated with the particular grid.

7. An apparatus for acquiring information, the apparatus comprising:

at least one processor; and a memory storing instructions, the instructions when executed by the at least one processor, cause the at least one processor to perform operations, the operations comprising:

determining an initial area corresponding to a target point of interest, and dividing the initial area corresponding to the target point of interest into a plurality of grids, wherein the dividing the initial area corresponding to the target point of interest into a plurality of grids comprises:

acquiring a plurality of user locations appeared in the initial area corresponding to the largest point of interest within a preset period;

clustering the plurality of user locations to obtain a plurality of location clustering results;

determining a center point of each of the plurality of location clustering results as the center point of each of a plurailty of to-be-generated grids respectively, the center point of the each of the plurality of location clustering results corresponding to the center point of the each of the plurality of to-be-generated grids; and determining, for the center point of the each of the plurality if to-be-generated grids, the center points of a preset number of other to-be-generated grids closest in distance to the center point of the each of the plurality of to-be-generated grids, and determining a contour of each of the plurality of to-be-generated grid, based on the center point of the each of the plurality of to-be-generated grid and the determined center points of the preset number of other to-be-generated grids closest in distance to the ceneter point of the each of the plurality of to-be-generated grids;

calculating, for the each of the plurality of grids, a Jaccard similarity coefficient between the each of the plurality of grids and each of the other grids, wherein the Jaccard similarity coeffiecient between the each of the plurality of grids to the each of the other grids is determined based on a number of users concurrently appeared in the each of the plurality of grids and the each of the other grids within the preset period, and a sum of a number of users appeared in the each of the plurality of grids within the preset period and the number of users appeared in the each of the other grids; and generating an annotation of each of the plurality of grids respectively based on characteristics of the plurality of grids, the characteristic of each of the plurality of grids comprising: dwell time, and a degree of relevance between the each of the plurality of grids and other grids, the annotation of each of the plurality of grids being used for indicating whether user data associated with the each of the plurality of grids is used to generate an attribute of the target point of interest.

8. The apparatus according to claim 7, wherein the operations further comprise:

determining a total similarity corresponding to the each of the plurality of grids based on the Jaccard similarity coefficient between each pair of grids in the plurality of grids; and using the determined total similarity corresponding to the each of the plurality of grids as the degree of relevance of the each of the plurality of grids respectively.

9. The apparatus according to claim 8, wherein the dwell time of the each of the plurality of grids is a median of the dwell time of the users appeared in the each of the plurality of grids within the preset period; and the generating annotations of the plurality of grids respectively based on characteristics of the plurality of grids comprises:

determining, for the each of the plurality of grids, whether the dwell time of the each of the plurality of grids is greater than a period threshold, when the dwell time of the each of the plurality of grids is a median of the dwell time of the users appeared in the each of the plurality of grids within the preset period; in response to determining that the dwell time is greater than the period threshold, generating the annotation of the each of the plurality of grids for indicating the user data associated with the each of the plurality of grids is used to generate the attribute of the target point of interest; and in response to determining that the dwell time is not greater than the period threshold, generating the annotation of the each of the plurality of grids for indicating the user data associated with the each of the plurality of grids is not used to generate the attribute of the target point of interest.

10. The apparatus according to claim 8, wherein the generating annotations of the plurality of grids respectively based on characteristics of the plurality of grids comprises:

determining, for the each of the plurality of grids, whether the degree of relevance of the each of the plurality of grids is greater than a degree of relevance threshold; in response to determining that the degree of relevance is greater than the degree of relevance threshold, generating the annotation of the each of the plurality of grids for indicating the user data associated with the each of the plurality of grids is used to generate the attribute of the target point of interest; and in response to determining that the degree of relevance is not greater than the degree of relevance threshold, generating the annotation of the each of the plurality of grids for indicating the user data associated with the each of the plurality of grids is not used to generate the attribute of the target point of interest.

11. The apparatus according to claim 8, wherein the generating annotations of the plurality of grids respectively based on characteristics of the plurality of grids comprises:

determining, for the each of the plurality of grids, whether a preset condition is met, wherein the preset condition comprises: the dwell time of the each of the plurality of grids is greater than a period threshold, and a product of a dwell time difference and the degree of relevance is greater than a product threshold, the dwell time difference being a difference between the dwell time of the each of the plurality of grids and the period threshold; in response to determining that the preset condition is met, generating the annotation of the each of the plurality of grids for indicating the user data associated with the each of the plurality of grids is used to generate the attribute of the target point of interest; and in response to determining that the preset condition is not met, generating the annotation of the each of the plurality of grids for indicating the user data associated with the each of the plurality of grids is not used to generate the attribute of the target point of interest.

12. A non-transitory computer-readable storage medium storing a computer program, the computer program when executed by one or more processors, causes the one or more processors to perform operations, the operations comprising:

determining an initial area corresponding to a target point of interest, and dividing the initial area corresponding to the target point of interest into a plurality of grids, wherein the dividing the initial area corresponding to the target point of interest into a plurality of grids comprises:

acquiring a plurality of user locations appeared in the initial area corresponding to the largest point of interest within a preset period;

clustering the plurality of user locations to obtain a plurality of location clustering results;

determining a center point of each of the plurality of location clustering results as the center point of each of a plurailty of to-be-generated grids respectively, the center point of the each of the plurality of location clustering results corresponding to the center point of the each of the plurality of to-be-generated grids; and determining, for the center point of the each of the plurality if to-be-generated grids, the center points of a preset number of other to-be-generated grids closest in distance to the center point of the each of the plurality of to-be-generated grids, and determining a contour of each of the plurality of to-be-generated grid, based on the center point of the each of the plurality of to-be-generated grid and the determined center points of the preset number of other to-be-generated grids closest in distance to the ceneter point of the each of the plurality of to-be-generated grids;

calculating, for the each of the plurality of grids, a Jaccard similarity coefficient between the each of the plurality of grids and each of the other grids, wherein the Jaccard similarity coeffiecient between the each of the plurality of grids to the each of the other grids is determined based on a number of users concurrently appeared in the each of the plurality of grids and the each of the other grids within the preset period, and a sum of a number of users appeared in the each of the plurality of grids within the preset period and the number of users appeared in the each of the other grids; and generating an annotation of each of the plurality of grids respectively based on characteristics of the plurality of grids, the characteristic of each of the plurality of grids comprising: dwell time, and a degree of relevance between the each of the plurality of grids and other grids, the annotation of each of the plurality of grids being used for indicating whether user data associated with the each of the plurality of grids is used to generate an attribute of the target point of interest.

* * * * *

UNITED STATES PATENT AND TRADEMARK OFFICE
CERTIFICATE OF CORRECTION

PATENT NO. : 11,481,666 B2
APPLICATION NO. : 16/250894
DATED : October 25, 2022
INVENTOR(S) : Xiaodi Zhang It is certified that error appears in the above-identified patent and that said Letters Patent is hereby corrected as shown below:

On the Title Page

Page 2, Column 1 (Other Publications), Line 3, delete "Berthodl," and insert -- Berthold, --.

In the Claims

Column 11, Line 42, Claim 1, delete "largest" and insert -- target --.

Column 11, Line 48, Claim 1, delete "plurailty" and insert -- plurality --.

Column 11, Line 54, Claim 1, delete "if" and insert -- of --.

Column 11, Line 58, Claim 1, delete "of each" and insert -- of the each --.

Column 11, Line 62, Claim 1, delete "ceneter" and insert -- center --.

Column 12, Line 1, Claim 1, delete "coeffiecient" and insert -- coefficient --.

Column 13, Line 45, Claim 7, delete "largest" and insert -- target --.

Column 13, Line 51, Claim 7, delete "plurailty" and insert -- plurality --.

Column 13, Line 57, Claim 7, delete "if" and insert -- of --.

Column 13, Line 61, Claim 7, delete "of each" and insert -- of the each --.

Column 13, Line 65, Claim 7, delete "ceneter" and insert -- center --.

Column 14, Line 4, Claim 7, delete "coeffiecient" and insert -- coefficient --.

Signed and Sealed this
Twenty-fourth Day of September, 2024

Katherine Kelly Vidal
*Director of the United States Patent and Trademark Office*

CERTIFICATE OF CORRECTION (continued)
U.S. Pat. No. 11,481,666 B2

Column 15, Line 37, Claim 12, delete "largest" and insert -- target --.

Column 16, Line 3, Claim 12, delete "plurailty" and insert -- plurality --.

Column 16, Line 9, Claim 12, delete "if" and insert -- of --.

Column 16, Line 13, Claim 12, delete "of each" and insert -- of the each --.

Column 16, Line 16, Claim 12, delete "ceneter" and insert -- center --.

Column 16, Line 22, Claim 12, delete "coeffiecient" and insert -- coefficient --.